United States Patent
Mauro

(10) Patent No.: US 11,167,623 B2
(45) Date of Patent: Nov. 9, 2021

(54) SLIDING GOLF CART WINDSHIELD ASSEMBLY

(71) Applicant: Edward Mauro, Oldsmar, FL (US)

(72) Inventor: Edward Mauro, Oldsmar, FL (US)

(*) Notice: Subject to any disclaimer, the term of this patent is extended or adjusted under 35 U.S.C. 154(b) by 223 days.

(21) Appl. No.: 16/453,540

(22) Filed: Jun. 26, 2019

(65) Prior Publication Data
US 2019/0389280 A1  Dec. 26, 2019

Related U.S. Application Data

(60) Provisional application No. 62/689,976, filed on Jun. 26, 2018.

(51) Int. Cl.
| | | |
|---|---|---|
| *E05F 11/00* | (2006.01) | |
| *B60J 1/06* | (2006.01) | |
| *E05D 15/16* | (2006.01) | |
| *E05D 13/00* | (2006.01) | |

(52) U.S. Cl.
CPC .............. *B60J 1/06* (2013.01); *E05D 13/12* (2013.01); *E05D 15/165* (2013.01); *B60Y 2200/86* (2013.01); *E05Y 2900/55* (2013.01)

(58) Field of Classification Search
CPC ........ B60J 1/06; E05D 13/12; E05D 13/1207; E05D 15/16; E05D 15/165; E05D 15/18; E05D 15/20; E05D 15/22; E05Y 2900/55; E05Y 2201/654; B60Y 2200/86
USPC ........................................... 49/447, 360, 121
See application file for complete search history.

(56) References Cited

U.S. PATENT DOCUMENTS

| | | | |
|---|---|---|---|
| 4,773,695 A | 9/1988 | Jones et al. | |
| 4,792,175 A | 12/1988 | Gerber | |
| 4,819,979 A | 4/1989 | Moglia | |
| 5,192,109 A * | 3/1993 | Roberts | B60J 1/06 280/DIG. 5 |
| 5,195,797 A | 3/1993 | Hobbs | |
| 5,385,379 A | 1/1995 | Heavner | |
| 5,385,380 A | 1/1995 | Heavner | |
| 5,568,953 A | 10/1996 | Showalter | |
| 5,975,615 A | 11/1999 | Showalter | |
| 6,158,801 A | 12/2000 | Tucker | |
| 6,206,447 B1 | 3/2001 | Nation | |
| 6,216,714 B1 | 4/2001 | Tucker | |
| 6,302,440 B1 | 10/2001 | Goodstein | |
| RE38,272 E | 10/2003 | Nation | |
| 6,663,158 B1 | 12/2003 | Showalter | |

(Continued)

*Primary Examiner* — Jerry E Redman
(74) *Attorney, Agent, or Firm* — Matthew G. McKinney, Esq.; Allen, Dyer et al.

(57) ABSTRACT

A sliding golf cart windshield assembly includes a first elongated rail having a top end and a bottom end, and a second elongated rail spaced apart from the first elongated rail and having a top end and a bottom end. An upper windshield pane has a first longitudinal edge and an opposing second longitudinal edge, where the upper windshield pane is positioned between the first and second elongated rails. In addition, the assembly includes a first upper plate secured to the first longitudinal edge of the upper windshield pane and being slidable within the first elongated rail, a first lower hub coupled to the bottom end of the first elongated rail, and a first belt having a first end first end fixed to the top end of the first elongated rail and passes around the first lower hub to the second end that is fixed to the first upper plate.

20 Claims, 4 Drawing Sheets

(56) References Cited

U.S. PATENT DOCUMENTS

| | | |
|---|---|---|
| 7,311,347 B1 | 12/2007 | Aller |
| 8,087,711 B1 * | 1/2012 | Mauro ................. B60J 1/06 |
| | | 296/89 |
| 9,038,317 B2 * | 5/2015 | Hansen ............. E05F 15/665 |
| | | 49/360 |
| 9,475,363 B2 * | 10/2016 | Mauro ................. B60J 1/06 |
| 9,797,182 B2 * | 10/2017 | Raap ................ E05F 15/665 |
| 2005/0093331 A1 | 5/2005 | Moskos et al. |
| 2005/0229494 A1 * | 10/2005 | Harari ............ E05D 15/0669 |
| | | 49/360 |
| 2006/0091089 A1 | 5/2006 | Christiansen et al. |
| 2006/0113817 A1 | 6/2006 | Gasper |
| 2008/0265611 A1 | 10/2008 | Flynn |
| 2009/0230714 A1 | 9/2009 | Reese |
| 2009/0278373 A1 | 11/2009 | Rouzer et al. |
| 2010/0060027 A1 | 3/2010 | Marsh et al. |
| 2011/0001331 A1 | 1/2011 | Hirneise |
| 2011/0260019 A1 * | 10/2011 | Held ................. B60R 5/047 |
| | | 248/201 |
| 2012/0098290 A1 | 4/2012 | Miller |
| 2012/0199294 A1 * | 8/2012 | Fayette ............. E06B 3/4415 |
| | | 160/99 |
| 2013/0062905 A1 | 3/2013 | Held |
| 2014/0203588 A1 | 7/2014 | Tyrer |
| 2015/0043051 A1 * | 2/2015 | Woodrow ........... G02F 1/0126 |
| | | 359/241 |
| 2015/0102630 A1 | 4/2015 | Guzzetta |

\* cited by examiner

SLIDING GOLF CART WINDSHIELD ASSEMBLY

CROSS-REFERENCE TO RELATED APPLICATIONS

This application claims priority to U.S. Provisional Application Ser. No. 62/689,976 filed on Jun. 26, 2018, the contents of which are herein incorporated by reference in their entirety.

TECHNICAL FIELD

The present invention relates to the field of golf carts, and, more particularly, to a sliding golf cart windshield assembly.

BACKGROUND

Golf carts are motorized vehicles that are most often used by golfers when playing a round of golf. Although golf is generally played in favorable weather conditions, there are instances when additional protection from cold weather, wind or rain is needed to the occupants of the golf cart. The additional protection may be provided using a windshield on the front of the golf cart.

Prior art windshields for golf carts have included two panels where the top panel is adapted to open by folding down over the lower panel to provide an open area at the front of the golf cart. However, a shortcoming of the prior art golf cart windshields is the inability to easily and effectively secure the upper panel when in an open position and folded down over the lower panel. Most windshields cannot be opened or closed from inside the golf cart. You must exit the car to open or close the windshield. Current windshields use rubber clips that over time get hard and crack rendering them inoperable. Current windshields typically have a PVC hinge connecting the top and the bottom. These hinges by nature turn yellow obstructing the view from the golf cart.

Other prior art windshields are designed to be completely removed from the golf cart or are required to be stored on the roof portion of the golf cart. Thereby, making such prior art windshields inconvenient and cumbersome to maneuver. None of the prior art golf cart windshields can be adjusted to provide an opening of variable height or to accommodate various widths and configurations of vertical supports that are used to secure the windshield to the golf cart.

SUMMARY

In view of the foregoing background, it is therefore an object of the present invention to provide an improved golf cart windshield assembly. In a particular aspect, the assembly includes a first elongated rail having a top end and a bottom end, a second elongated rail spaced apart from the first elongated rail and having a top end and a bottom end, and an upper windshield pane having a first longitudinal edge and an opposing second longitudinal edge.

The upper windshield pane is positioned between the first and second elongated rails. A first upper plate is secured to the first longitudinal edge and is slidable within the first elongated rail, and a second upper plate is secured to the second longitudinal edge and being slidable within the second elongated rail.

The assembly also includes a first belt having a first end and a second end, where the first end is fixed to the top end of the first elongated rail, and the second end fixed to the first upper plate. A first resilient member has a bottom end and a top end, where the bottom end is secured to the bottom end of the first elongated rail. A lower hub is coupled to the top end of the first resilient member and the first belt passes from the top end of the first elongated member and around the lower hub to the first upper plate.

In addition, the assembly includes a second belt having a first end and a second end, where the first end is fixed to the top end of the second elongated rail, and the second end is fixed to the second upper plate. A second resilient member has a bottom end and a top end, where the bottom end is secured to the bottom end of the second elongated rail, and an upper hub is coupled to the top end of the second resilient member and the second belt passes from the top end of the second elongated member and around the upper hub to the second upper plate.

The assembly may be configured to be secured to vertical support members of a golf cart. The first and second resilient members may be configured to counterbalance the upper windshield pane, and the assembly may have a lower windshield pane that is also fixed between the first and second elongated rails. In addition, a plurality of adjustment clamps may be coupled to the first and second elongated rails and each be configured to adjust an amount of friction between the upper windshield pane and the first and second elongated rails when sliding the upper windshield pane up and down. The assembly may also include a first upper hub coupled to the top end of the first elongated rail, where the first belt passes around the first upper hub. A second upper hub may be coupled to the top end of the second elongated rail, where the second belt passes around the second upper hub. The first and second belts may comprise flexible cords and the first and second lower hubs may each comprise a pulley. In addition, the first and second resilient members may comprise springs.

In another particular aspect, a sliding golf cart windshield assembly includes a first elongated rail having a top end and a bottom end, a second elongated rail spaced apart from the first elongated rail and having a top end and a bottom end, and an upper windshield pane having a first longitudinal edge and an opposing second longitudinal edge. The upper windshield pane is positioned between the first and second elongated rails. A first upper plate is secured to the first longitudinal edge of the upper windshield pane and being slidable within the first elongated rail, and a first lower hub is coupled to the bottom end of the first elongated rail. In addition, the assembly includes a first belt having a first end and a second end, the first end fixed to the top end of the first elongated rail and the first belt passes around the first lower hub to the second end being fixed to the first upper plate.

In yet another particular aspect, a sliding golf cart windshield assembly includes a first elongated rail having a top end and a bottom end, a second elongated rail spaced apart from the first elongated rail and having a top end and a bottom end, and an upper windshield pane having a first longitudinal edge and an opposing second longitudinal edge. The upper windshield pane is positioned between the first and second elongated rails, and a lower windshield pane is positioned between the first and second elongated rails. The upper windshield pane is configured to slide up from the lower windshield pane. In addition, the assembly includes a resilient member having a top end and a bottom end, where the top end is coupled to the upper windshield pane and the bottom end is fixed in place to counterbalance the upper windshield pane.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
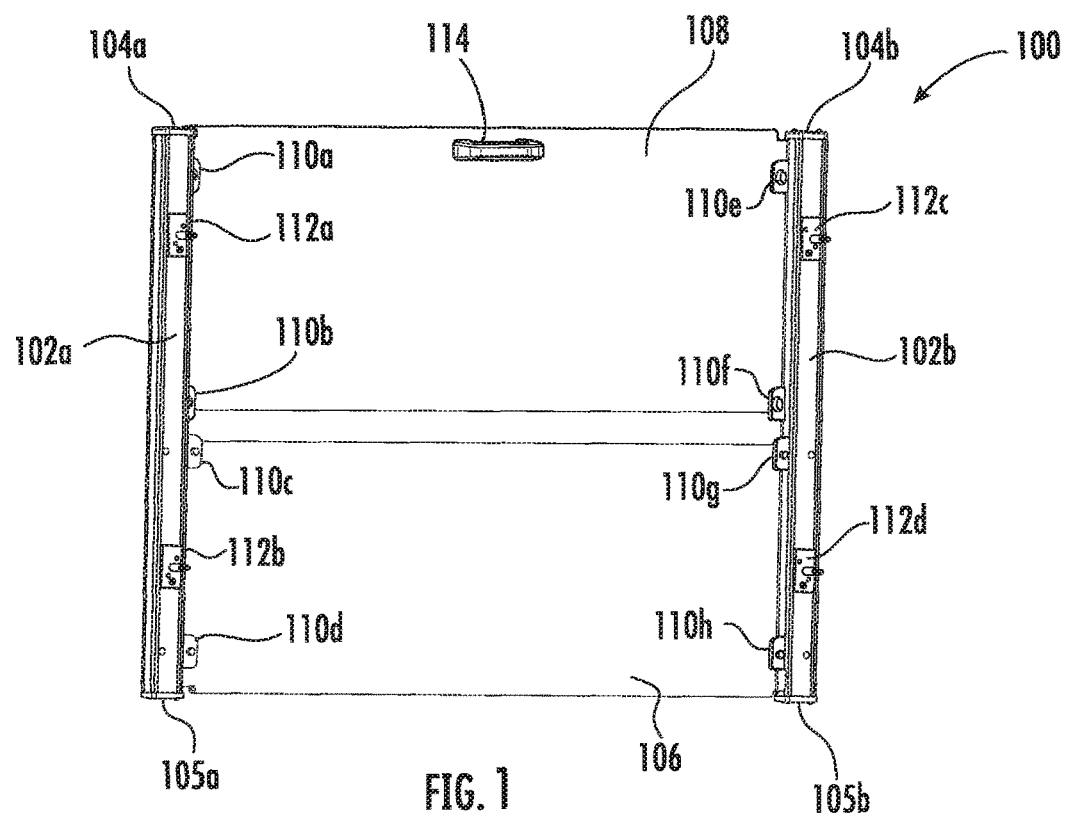
FIG. 1 is a front view of a sliding golf cart windshield assembly in accordance with a particular aspect of the invention.
Figure 2:
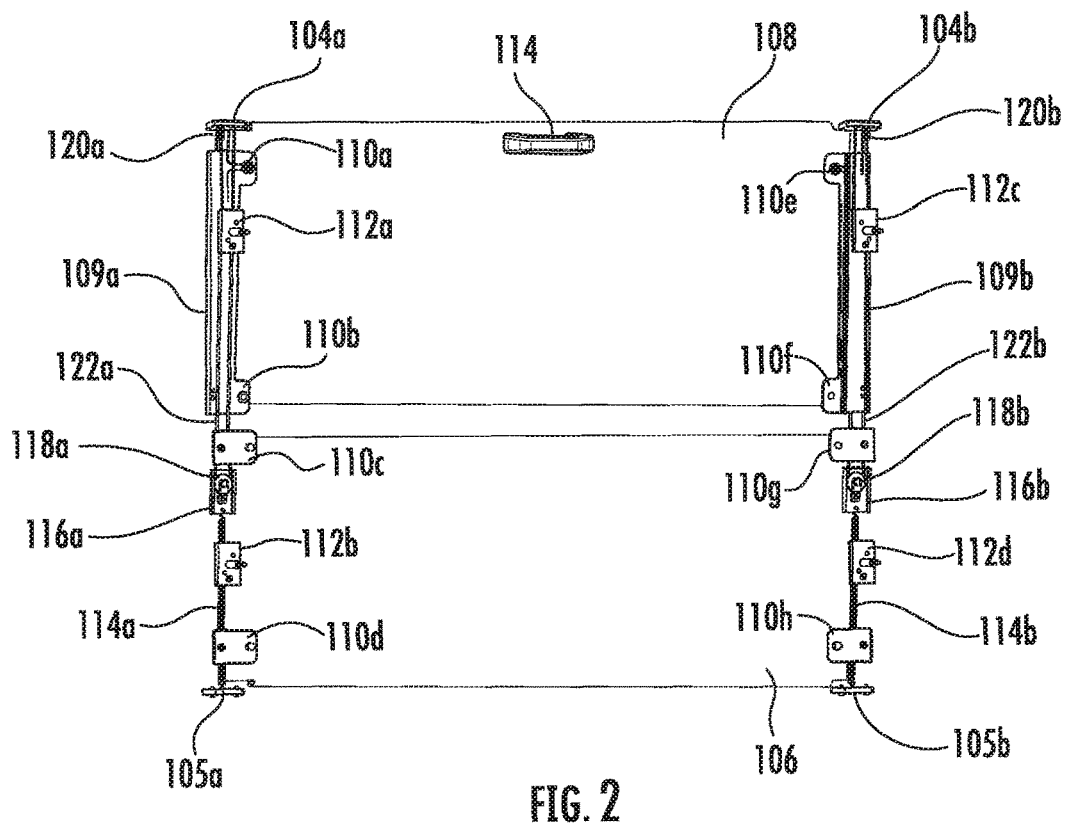
FIG. 2 is a front view of the sliding golf cart windshield assembly of FIG. 1 without the elongated rails.

Referring to FIGS. 1 and 2, a particular aspect of a sliding golf cart windshield assembly is disclosed and generally designated 100. As shown in FIG. 1, the windshield assembly 100 includes a first elongated rail 102a having a top end 104a and a bottom end 105a and a second elongated rail 102b spaced apart from the first elongated rail 102a. The second elongated rail 102b also has a top end 104b and a bottom end 105b. A lower windshield pane 106 and an upper windshield pane 108 are positioned between the pair of elongated rails 102a, 102b.

The upper windshield pane 108 has a first longitudinal edge and an opposing second longitudinal edge. A first upper plate 109a is secured to the first longitudinal edge of the upper windshield pane 108 by flanges 110a, 110b as shown in FIG. 2 where the first and second elongated rails have been removed for clarity. The first upper plate 109a is slidable within the first elongated rail. Similarly, a second upper plate 109b is secured to the second longitudinal edge of the upper windshield pane 108 by flanges 110e, 110f and is slidable within the second elongated rail 102a.

Figure 3:
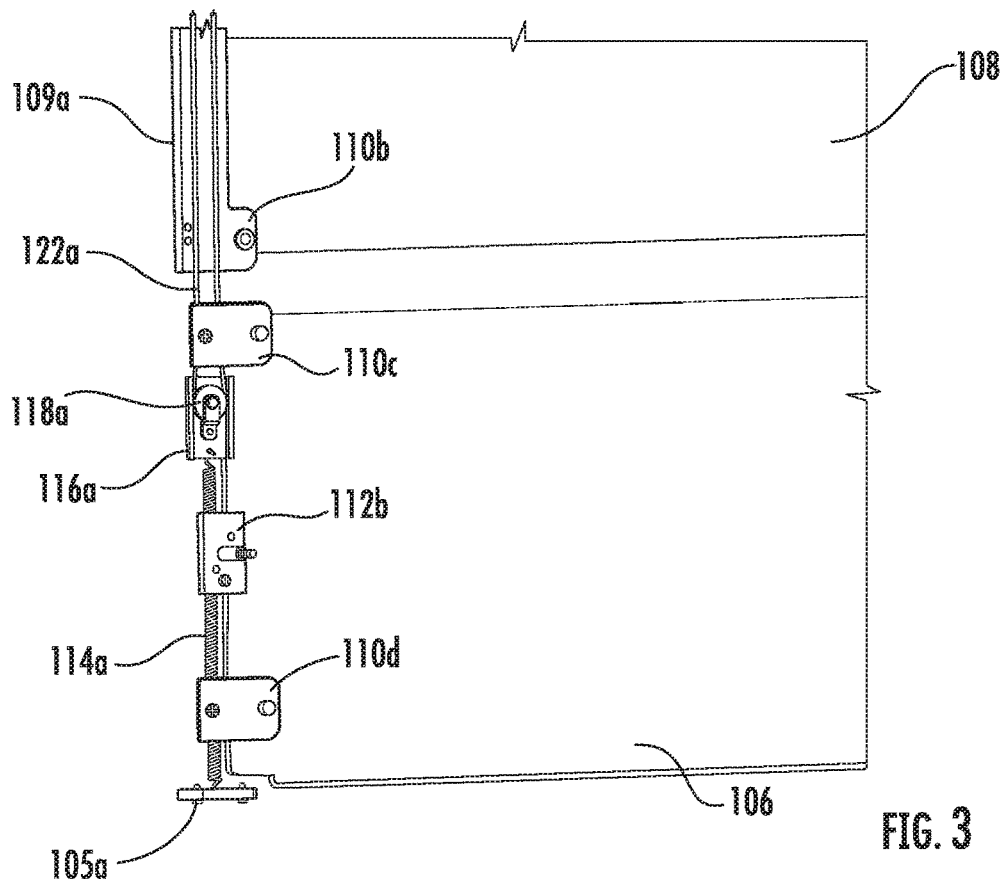
FIG. 3 is a detail view of a front lower portion of the sliding golf cart windshield assembly of FIG. 2.
Figure 4:
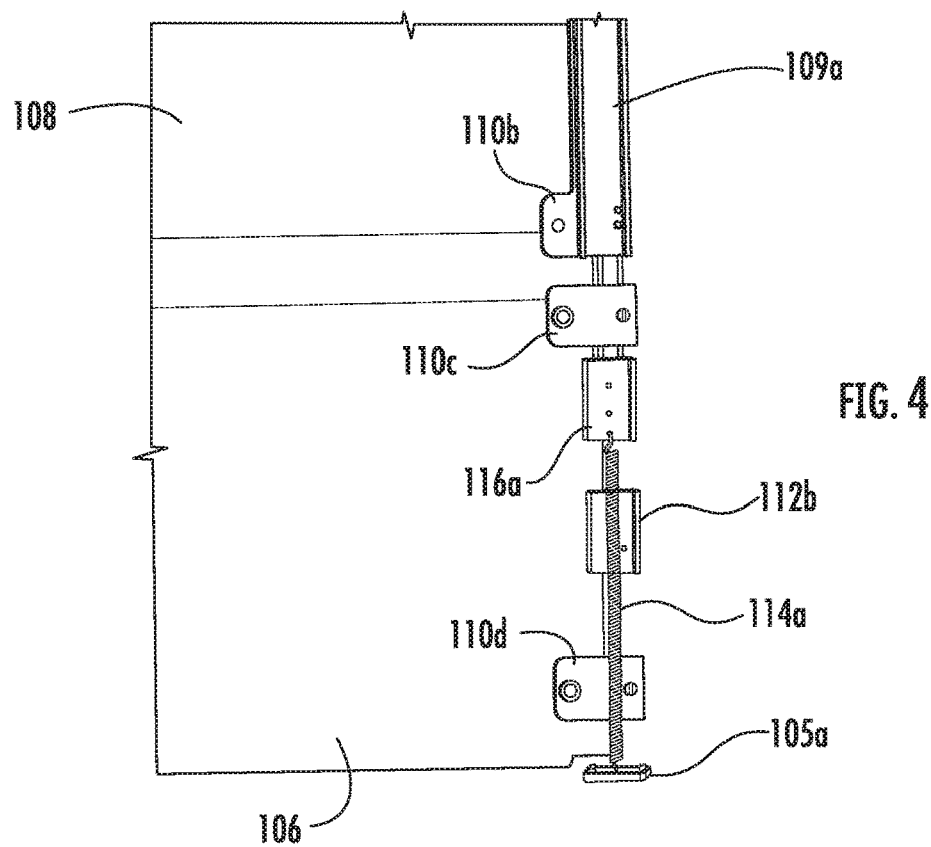
FIG. 4 is a detail view of a rear lower portion of the sliding golf cart windshield assembly of FIG. 2.

The assembly 100 also includes a first belt 122a having a first end 127a and a second end 125a. The first end 127a is fixed to the top end 104a of the first elongated rail 102a, and the second end 125a is fixed to the first upper plate 109a. A first resilient member 114a has a bottom end and a top end, where the bottom end is secured to the bottom end 105a of the first elongated rail 102a as shown in FIG. 3, which is a detail view of a front lower portion of the sliding golf cart windshield assembly 100. FIG. 4 is a detail view of a rear lower portion of the sliding golf cart windshield assembly 100.

Still referring to FIGS. 3 and 4, a lower first hub 118a is coupled to the top end of the first resilient member 114a and the first belt 122a passes from the top end 104a of the first elongated member 102a and around the lower first hub 118a to the first upper plate. The lower first hub 118a is carried by a first base 116a.

In addition, the assembly 100 may include a second belt 122b having a first end 127b and a second end 125b similar to the first belt 122a, where the first end 127b is fixed to the top end 104b of the second elongated rail 102b, and the second end 125b is fixed to the second upper plate 109b in similar fashion as the first belt 122a. A second resilient member 114b has a bottom end and a top end, where the bottom end is secured to the bottom end 105b of the second elongated rail 102b. A lower second hub 118b is coupled to the top end of the second resilient member 114b and the second belt 122b passes from the top end 104b of the second elongated member 102b and around the lower second hub 118b to the second upper plate 109b. The lower second hub 118b is carried by a second base 116b.

The first and second resilient members 114a, 114b may be configured to counterbalance the upper windshield pane 108. In addition, a plurality of adjustment clamps 112a, 112b, 112c, 112d may be coupled to the first and second elongated rails 102a, 102b and each be configured to adjust an amount of friction between the upper windshield pane 108 and the first and second elongated rails 102a, 102b when sliding the upper windshield pane 108 up and down.

Figure 5:
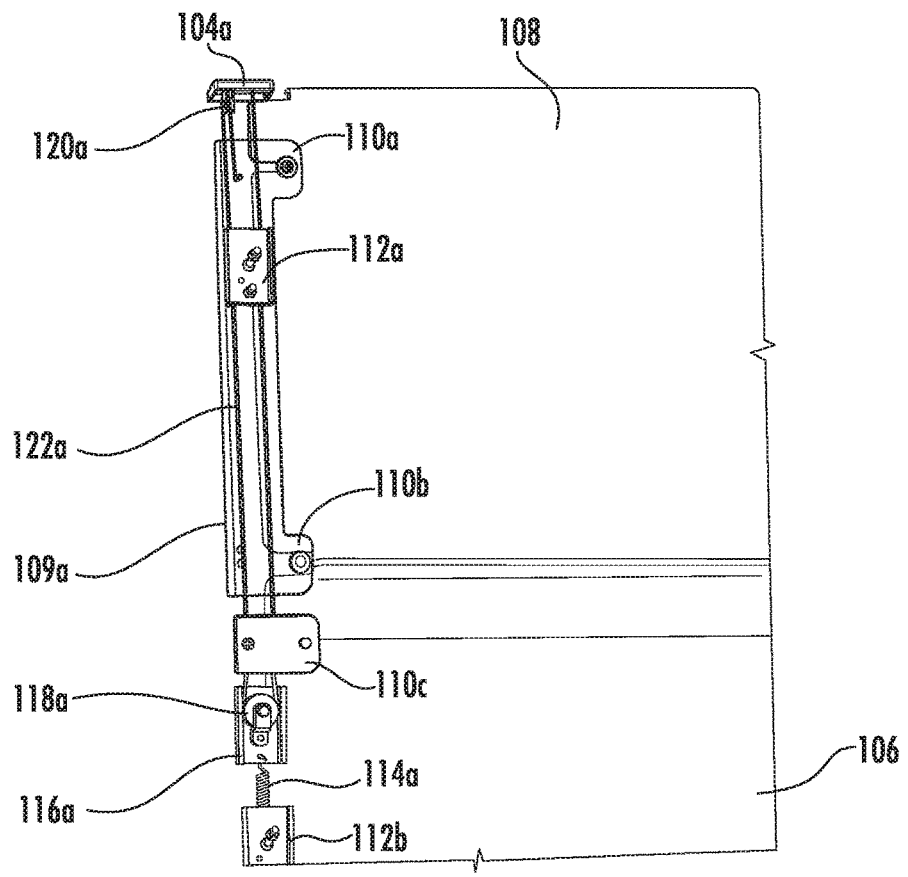
FIG. 5 is a detail view of a front upper portion of the sliding golf cart windshield assembly of FIG. 2.
Figure 6:
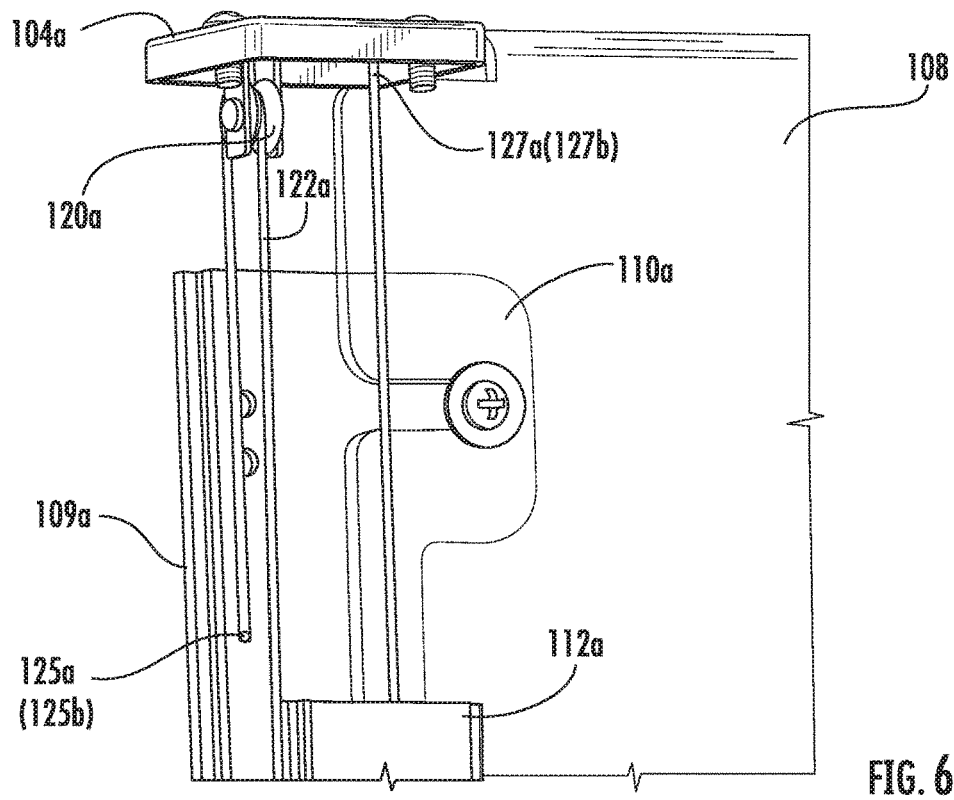
FIG. 6 is a detail view of the front upper portion of the sliding golf cart windshield assembly of FIG. 5.
Figure 7:
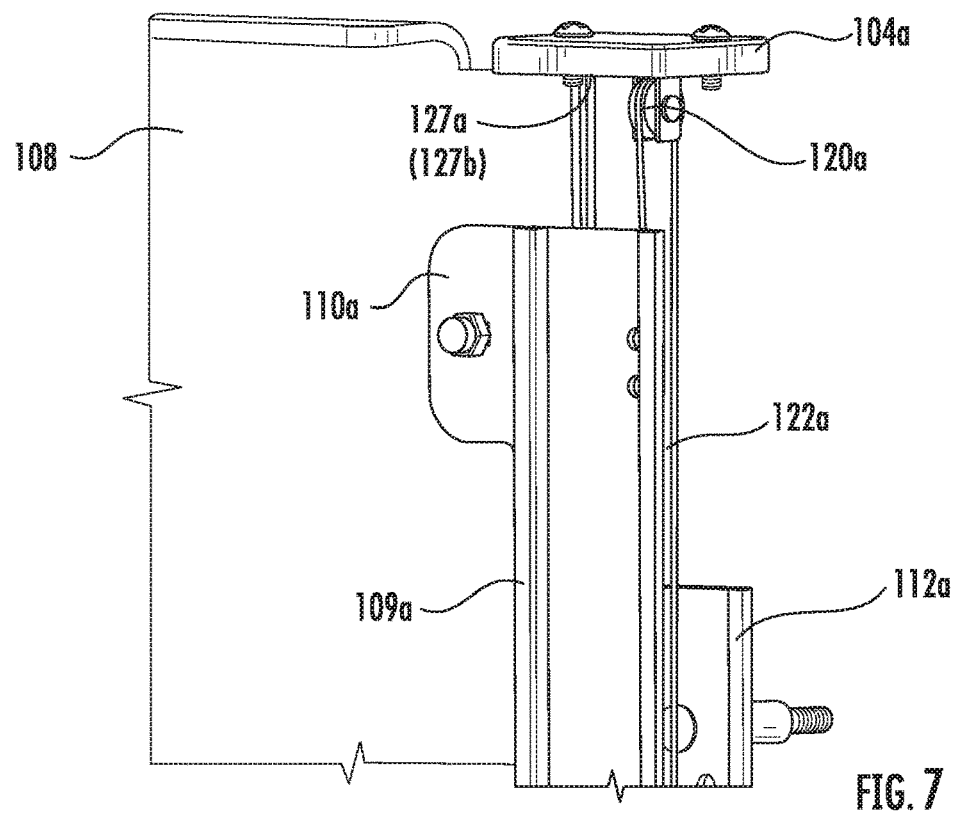
FIG. 7 is a detail view of a rear upper portion of the sliding golf cart windshield assembly of FIG. 5.

The assembly 100 may also include a first upper hub 120a as shown in FIG. 5, which is a detail view of a front upper portion of the sliding golf cart windshield assembly 100. The first upper hub 120 is coupled to the top end 104a of the first elongated rail 102a, where the first belt 122a passes around the first upper hub 120a as best shown in FIGS. 6 and 7. The first end 127a of the first belt 122a is also shown fixed to the top end 104. A second upper hub 120b (see FIG. 2) may be coupled to the top end 104b of the second elongated rail 102b, where the second belt 122b passes around the second upper hub 120b similar to the first upper hub 120a.

The first and second belts 122a, 122b may comprise flexible cords and the first and second lower hubs 120a, 120b may each comprise a pulley. In addition, the first and second resilient members 114a, 114b may comprise springs.

Figure 8:
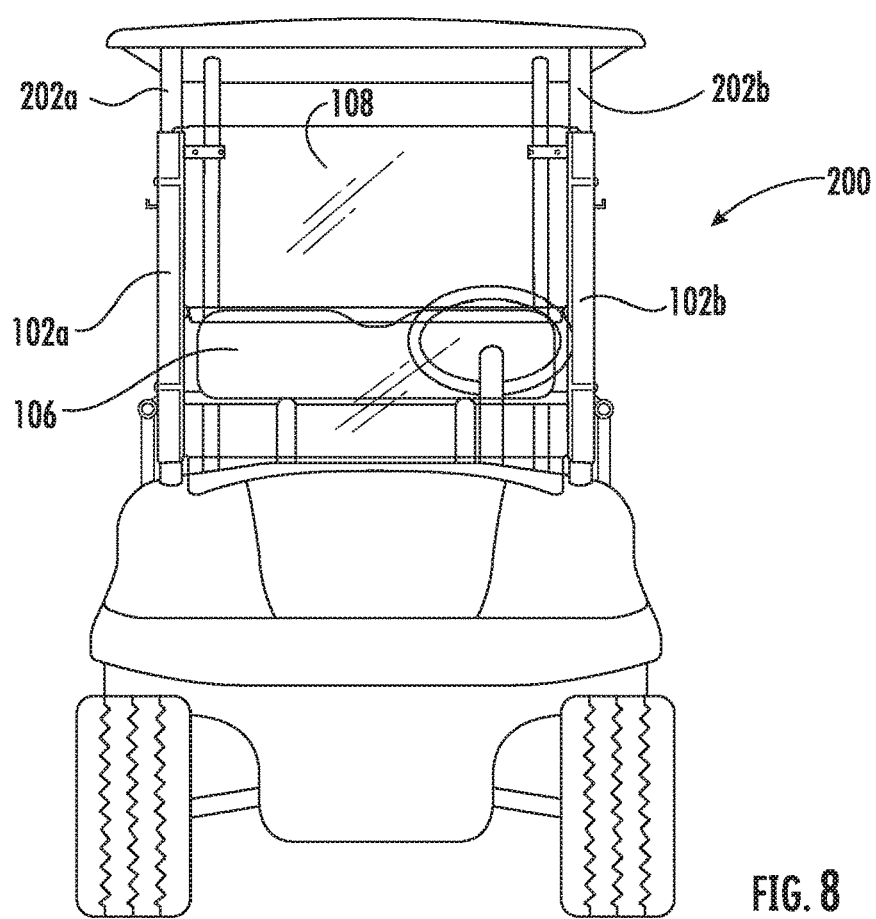
FIG. 8 is a front view of the sliding golf cart windshield assembly installed on a golf cart.

As described above, the assembly 100 may be configured to be secured to vertical support members 202a, 202b of a golf cart 200 as shown in FIG. 8. Clamps 112a, 112b, 112c, 112d may be used to secure the windshield assembly 100 to the golf cart 140.

The elongated rails 102a, 102b may generally be square or any other shape. The windshield panes 106, 108 are easily replaceable if damaged because they require no glue in contrast to prior art windshield assemblies.

A lower edge of the upper windshield pane 108 overlaps the lower windshield pane 106 when the upper windshield pane 108 is in the uppermost vertical position. This provides a complete barrier that protects the driver and passenger of the golf cart 200 from the weather such as wind and rain, for example. Existing typical golf cart windshields include two panes that are hinged together, which does not provide full protection from the elements through the gap between the panes in addition to not being vertically adjustable.

The clamps 112a, 112b, 112c, 112d may be used to removably secure the windshield assembly 100 to the golf cart 200. The clamps 112a, 112b, 112c, 112d may have a square, round or other shaped interior surface to fit around the vertical support members 202a, 202b. The clamps 114 may slip over the vertical support members 112a, 112b, 112c, 112d and then can be adjusted to clamp the windshield assembly 100 firmly in place, or can be bolted directly to the vertical support members 202a, 202b.

The upper windshield pane 108 is held in the desired vertical position, in part, by using the resilient members 114a, 114b that function to counterbalance the weight of the upper windshield pane 108. In addition, the clamps 112a, 112b, 112c, 112d, may be adjusted to increase the friction resistance of the first and second plates 109a, 109b sliding inside the first and second elongated rails 102a, 102b. The more friction requires more force by the user to raise and lower the upper windshield pane 108. The desired amount of adjustment will allow the user to comfortable lower and raise the upper windshield pane 108 while at the same time the upper windshield pane 108 is held in the desired position without the use of latches so that it has nearly infinite adjustment.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A sliding golf cart windshield assembly, the assembly comprising:
    a first elongated rail having a top end and a bottom end;
    a second elongated rail spaced apart from the first elongated rail and having a top end and a bottom end;
    an upper windshield pane having a first longitudinal edge and an opposing second longitudinal edge, the upper windshield pane slidably positioned between the first and second elongated rails;
    a first upper plate secured to the first longitudinal edge and being slidable within the first elongated rail;
    a second upper plate secured to the second longitudinal edge and being slidable within the second elongated rail;
    a first belt having a first end and a second end, the first end fixed to the top end of the first elongated rail, and the second end fixed to the first upper plate;
    a first resilient member having a bottom end and a top end, the bottom end secured to the bottom end of the first elongated rail;
    a first lower hub coupled to the top end of the first resilient member and the first belt passes from the top end of the first elongated member and around the first lower hub to the first upper plate;
    a second belt having a first end and a second end, the first end fixed to the top end of the second elongated rail, and the second end fixed to the second upper plate;
    a second resilient member having a bottom end and a top end, the bottom end secured to the bottom end of the second elongated rail; and
    a second lower hub coupled to the top end of the second resilient member and the second belt passes from the top end of the second elongated member and around the second lower hub to the second upper plate.

2. The sliding golf cart windshield assembly of claim 1, further comprising a lower windshield pane fixed between the first and second elongated rails.

3. The sliding golf cart windshield assembly of claim 1, further comprising a plurality of adjustment clamps coupled to the first and second elongated rails and that are each configured to adjust an amount of friction between the upper windshield pane and the first and second elongated rails when sliding the upper windshield pane up and down.

4. The sliding golf cart windshield assembly of claim 1, further comprising a first upper hub coupled to the top end of the first elongated rail, wherein the first belt passes around the first upper hub.

5. The sliding golf cart windshield assembly of claim 1, further comprising a second upper hub coupled to the top end of the second elongated rail, wherein the second belt passes around the second upper hub.

6. The sliding golf cart windshield assembly of claim 1, wherein the first and second lower hubs each comprise a pulley.

7. The sliding golf cart windshield assembly of claim 1, wherein the first and second resilient members comprise springs.

8. The sliding golf cart windshield assembly of claim 1, wherein the assembly is configured to be secured to vertical support members of a golf cart.

9. The sliding golf cart windshield assembly of claim 1, wherein the first and second resilient members are configured to counterbalance the upper windshield pane.

10. The sliding golf cart windshield assembly of claim 1, wherein the first and second belts comprise flexible material.

11. A sliding golf cart windshield assembly, the assembly comprising:
    a first elongated rail having a top end and a bottom end;
    a second elongated rail spaced apart from the first elongated rail and having a top end and a bottom end;
    an upper windshield pane having a first longitudinal edge and an opposing second longitudinal edge, the upper windshield pane positioned between the first and second elongated rails;
    a first upper plate secured to the first longitudinal edge of the upper windshield pane and being slidable within the first elongated rail;
    a first lower hub coupled to the bottom end of the first elongated rail; and
    a first belt having a first end and a second end, the first end fixed to the top end of the first elongated rail and the first belt passes around the first lower hub to the second end being fixed to the first upper plate.

12. The sliding golf cart windshield assembly of claim 11, further comprising a first resilient member having a bottom end and a top end, the bottom end secured to the bottom end of the first elongated rail and the top end secured to the first lower hub.

13. The sliding golf cart windshield assembly of claim 12, wherein the first resilient member is configured to counterbalance the upper windshield pane.

14. The sliding golf cart windshield assembly of claim 11, further comprising a second upper plate secured to the second longitudinal edge and being slidable within the second elongated rail.

15. The sliding golf cart windshield assembly of claim 11, further comprising a second lower hub coupled to the bottom end of the second elongated rail.

16. The sliding golf cart windshield assembly of claim 15, further comprising a second belt having a first end and a second end, the first end fixed to the top end of the second elongated rail and the second belt passes around the second lower hub to the second end being fixed to the second upper plate.

17. The sliding golf cart windshield assembly of claim 15, further comprising a second resilient member having a bottom end and a top end, the bottom end secured to the bottom end of the second elongated rail.

18. The sliding golf cart windshield assembly of claim 11, further comprising a lower windshield pane fixed between the first and second elongated rails.

19. A sliding golf cart windshield assembly, the assembly comprising:
    a first elongated rail having a top end and a bottom end;
    a second elongated rail spaced apart from the first elongated rail and having a top end and a bottom end;

an upper windshield pane having a first longitudinal edge and an opposing second longitudinal edge, the upper windshield pane positioned between the first and second elongated rails;

a lower windshield pane positioned between the first and second elongated rails, the upper windshield pane configured to slide up from the lower windshield pane; and a resilient member having a top end and a bottom end, the top end coupled to the upper windshield pane and the bottom end fixed in place to counterbalance the upper windshield pane.

20. The sliding golf cart windshield assembly of claim 19, further comprising a belt having a first end and a second end, the first end fixed to the top end of the first elongated rail and the second end coupled to the resilient member.

* * * * *